(12) United States Patent
Bellows et al.

(10) Patent No.: US 9,394,618 B1
(45) Date of Patent: Jul. 19, 2016

(54) SYSTEM AND METHOD FOR CLEANING STATOR COOLING COILS

(71) Applicant: Siemens Energy, Inc., Orlando, FL (US)

(72) Inventors: James C. Bellows, Maitland, FL (US); Christopher D. Mize, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/803,150

(22) Filed: Jul. 20, 2015

(51) Int. Cl.
| | |
|---|---|
| *B08B 3/08* | (2006.01) |
| *B08B 9/027* | (2006.01) |
| *C23G 1/00* | (2006.01) |
| *H02K 9/19* | (2006.01) |
| *C23G 1/10* | (2006.01) |

(52) U.S. Cl.
CPC ... *C23G 1/00* (2013.01); *B08B 3/08* (2013.01); *B08B 9/027* (2013.01); *C23G 1/103* (2013.01); *H02K 9/19* (2013.01)

(58) Field of Classification Search
CPC ............ B08B 3/08; B08B 9/032; C02F 1/70; C02F 2103/023; C02F 2303/08; F28G 9/00; C23G 1/103; C23G 1/00
USPC ............................. 134/2, 22.1, 22.14, 22, 19
See application file for complete search history.

(56) References Cited

U.S. PATENT DOCUMENTS

| | | | | |
|---|---|---|---|---|
| 3,664,870 A | * | 5/1972 | Oberhofer | C23G 1/36 134/10 |
| 4,430,129 A | * | 2/1984 | Gamer | H02K 9/005 134/22.19 |
| 4,876,232 A | * | 10/1989 | Barkatt | B01D 15/00 210/679 |
| 5,764,717 A | * | 6/1998 | Rootham | C02F 5/12 134/1 |
| 6,554,006 B2 | * | 4/2003 | Rowe | B08B 9/032 134/22.11 |
| 6,596,175 B2 | | 7/2003 | Rowe | |
| 8,519,577 B2 | | 8/2013 | Stiesdal | |
| 2012/0031435 A1 | | 2/2012 | Szakalos et al. | |

\* cited by examiner

*Primary Examiner* — Saeed T Chaudhry

(57) ABSTRACT

Methods and systems are disclosed for removing cuprous oxide deposits from a copper-containing water-based cooling system, such as those used to cool stators in industrial generators, without disrupting operation of the cooling system. A complexing agent, such as a 1,10-phenanthroline, e.g., 2,9-dimethyl-1,10-phenanthroline (neocuproine), a 2,2-bipyridine compound, or the like can be introduced into the coolant fluid to facilitate dissolution of the deposits by forming a complex with the cuprous ions. The complexing agent can be dissolved in an alcohol at a concentration of about 4-5%, and then added to the coolant fluid to a concentration of about 6e-3 M or less to avoid undesirable precipitation of the agent. The complexing agent can be recovered by flowing the coolant mixture through an adsorbent material such as activated carbon, and the copper can be removed from the agent by reacting it with sodium sulfide.

16 Claims, 2 Drawing Sheets

SYSTEM AND METHOD FOR CLEANING STATOR COOLING COILS

FIELD OF THE DISCLOSURE

The invention relates to the field of large industrial electrical power generators having liquid cooled stators. The invention particularly relates to liquid cooling systems for those stators, and more particularly to a system and method for removing cuprous oxide deposits from conduits in such systems and from other copper-containing conduits.

BACKGROUND INFORMATION

Industrial electrical power generators are large generators that often include water-based cooling systems for the stators. These stator cooling water (SCW) systems can provide a flow of cooling water through fine tubes to cool the windings in the stator, e.g., through hollow strands of the stator winding coil or the like. The cooling fluid removes heat from the stator windings that is generated by the large electrical currents flowing through the windings. The SCW system typically includes a network of conduits that connect the tubes in the stators to a reservoir, pump system, heat exchanger, and filter/strainer arrangements. It is important that these fine tubes, as well as any filter or strainer arrangements, remain open and clear of obstructions to ensure a continuous and sufficient flow of cooling water to all parts of the stator.

During operation of industrial generators, deposition of copper oxides within the fine tubes and conduits of the SCW system can occur. These precipitates can form by dissolution of small amounts of copper (Cu) from the conductive stator windings into the cooling water, and precipitation of copper oxides onto internal surfaces of the SCW system. Such precipitation can occur, e.g., in the portion of the system leading into the stator tubes, where the cooling water is at a relatively low temperature and dissolved copper ions may be supersaturated in the water. In high-oxygen systems (e.g., systems having a relatively high dissolved oxygen concentration in the cooling water of greater than about 2000 µg/l (ppb), such as with air-saturated water), the precipitates formed are predominantly cupric oxide (CuO). In low-oxygen systems (e.g., where the dissolved oxygen content is less than about 50 µg/l (ppb)), the precipitates are mostly cuprous oxide ($Cu_2O$). These deposits can accumulate near the openings of the fine tubes in the stators, thereby reducing flow of cooling water therethrough and possibly leading to undesirable or dangerous overheating of the stator.

Cleaning or removal of copper oxide deposits in SCW systems can be important for maintaining proper operating conditions of the generator and avoiding overheating of the stator, by maintaining sufficient flow of the water coolant through the system. Further, shutdown and restarting of industrial generators can be a costly and disruptive process. Accordingly, it is desirable to remove copper oxide deposits in SCW systems without shutting down the generator, e.g., to provide a system and method for copper oxide removal that is compatible with operating conditions of the generator and can be achieved while the generator is operating normally.

Certain techniques for cleaning copper oxides from generator cooling systems have been described. For example, U.S. Pat. No. 6,596,175 describes a method for dissolving cupric oxide (CuO) by introducing $CO_2$ into the cooling water to increase the CuO solubility, thereby dissolving some of the precipitated CuO. U.S. Pat. No. 6,554,006 describes a similar method for dissolving CuO precipitates in generator cooling systems by introducing agents such as mineral acid solutions or oxidants such as EDTA into the cooling water to dissolve the precipitated CuO. Such cleaning methods have been developed primarily to dissolve cupric oxide, and are not generally effective for cleaning or removal of cuprous oxide ($Cu_2O$) precipitates.

Further, it is important to maintain a low ionic concentration in the coolant water of SCW systems during operation of a generator. Unwanted electrical flashover of stator currents to ground can occur, for example, if the high fields in the stator windings find a conductive path through the coolant water. For example, a typical upper conductivity limit for coolant water in generators is about 10 µS/cm. This limitation can reduce the efficacy of copper oxide removal using certain compounds that may increase ionic concentrations (and conductivity) of the coolant water.

Accordingly, it can be desirable to provide a system and method for removing cuprous oxide deposits from stator cooling systems of industrial generators and the like, where such removal can be achieved while the generator is operating.

SUMMARY OF THE DISCLOSURE

Exemplary embodiments of the present disclosure provide method and system for removing cuprous oxide deposits from stator cooling water (SCW) systems of industrial generators and similar water-based copper-containing cooling systems. The system can be configured to introduce a complexing agent into the coolant that is capable of forming complexes with cuprous ions and dissolving cuprous oxide deposits that may be present in the cooling system. Such dissolution of deposits can be achieved while continuing operation of the generator and SCW system, e.g., without a shutdown of the generator or disassembly of the cooling system.

The complexing agent can be a 1,10-phenanthroline, e.g., 2,9-dimethyl-1,10-phenanthroline (also known as neocuproine), a 2,2-bipyridine compound, or a similar molecule that is known to form complexes with cuprous ions. The complexing agent can be dissolved in a short-chain alcohol (e.g., ethanol or methanol), a ketone, or an aromatic solvent to form a cleaning solution, and such solution can be introduced into the circulating coolant. The complexing agent can be provided at a concentration of about 5% in the solvent, or slightly less (e.g. about 4-4.5%), to avoid unwanted precipitation of the complexing agent. Optionally, a prepared coolant mixture containing both alcohol and dissolved complexing agent can be added directly to the cooling system, e.g., by replacing some of the existing coolant. A weak acid can optionally be added to the cleaning solution and/or coolant to improve the dissolution rate of the deposits and maintain an approximately neutral pH as the deposits react with the complexing agent.

The complexing agent can be introduced from a cleaning solution source directly into a conduit or reservoir of the SCW system. The SCW system can also be provided with a drain to remove coolant from the SCW system. A portion of the original coolant can be removed and replaced with cleaning solution, and/or coolant containing the complexing agent that has formed complexes to some degree with cuprous ions can be removed via the drain and replaced with fresh (uncomplexed) complexing agent, or with standard coolant after the cleaning procedure is completed.

The complexing agent can be added to the coolant to achieve an overall concentration of about 6e-3 M or slightly less, e.g., about 4e-3 to 5e-3 M, which can provide good dissolution of the complexing agent with an acceptable amount of solvent in the cooling system. In further embodiments, the complexing agent can be added incrementally to build the concentration up to such levels over time, thereby allowing some complexing of the cuprous ions with the agent to occur before reaching the maximum concentration f the agent in the coolant.

Various techniques and arrangements can be used to detect and/or estimate the progress and/or extent of cuprous oxide removal from the SCW system. For example, temperature and/or flow sensors can be used to assess changes in the operating conditions of the SCW system as cuprous oxide deposits are dissolved during the cleaning procedure. Optical and/or chemical sensors can also be used to indicate the degree to which the complexing agent in the coolant has formed complexes with copper ions from the cuprous oxide deposits. Such indictors can be used to determine when or if additional complexing agent is to be added to the cooling system, complexed complexing agent is to be removed from the system (e.g., for optional recovery of the agent), and when a sufficient amount or level of the deposits have been removed from the cooling system.

After the operation of the cooling system has reached an acceptable level and/or the removal of cuprous ions has diminished, the coolant mixture (which can contain alcohol and complexing agent) can be removed from the system and replaced with fresh (standard) coolant, and the SCW system can continue to operate.

In further embodiments, a recovery arrangement can be used to recover at least a portion of the complexing agent used in the cleaning process. For example, a drain can be provided in the cooling system to facilitate removal of the circulating coolant mixture containing the complexing agent for processing in the recovery arrangement. The recovery arrangement can include a fluid bed which contains an adsorbent material. The coolant mixture can be directed through the bed to facilitate adsorption of the complexing agent (which may be unreacted and/or complexed with cuprous ions).

In certain embodiments, the adsorbent material can be an ion exchange resin. In further embodiments, the adsorbent material can include activated carbon. The adsorbent material in the fluid bed can be provided at a particular depth, e.g., greater than about 50 cm, to facilitate effective adsorption of the complexing agent from the coolant mixture. The bed can be configured to provide a low flow rate of the coolant mixture through the adsorbent material, e.g., less than about 2 cm/minute or less than about 1 cm/minute, to provide a good yield of complexing agent recovery. In certain embodiments, the recovery arrangement can be provided as a single fluid bed. In further embodiments, the recovery arrangement can be provided as a plurality of fluid beds.

After the coolant mixture has passed through the one or more fluid beds of the recovery arrangement, an extraction fluid (e.g., a solvent) can be flowed through the adsorbent material to remove the adsorbed complexing agent. Examples of extraction fluids that may be used include, e.g., denatured alcohol or hexanol. The extraction fluid can then be evaporated or otherwise reacted to concentrate the recovered complexing agent using standard chemical techniques.

In a further embodiment, the coolant mixture (which can contain, e.g., water and alcohol) can be passed through a further fluid bed containing uncomplexed complexing agent, to dissolve the complexing agent therein (e.g., up to the solubility limit or slightly less). This resulting coolant mixture can then be re-introduced into the SCW system instead of, or in addition to, more cleaning solution to facilitate further removal of cuprous oxide deposits from the cooling system.

These and other objects, features and advantages of the present disclosure will become apparent upon reading the following detailed description of embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying figures showing illustrative embodiments, results and/or features of the exemplary embodiments of the present disclosure, in which.

Figure 1:
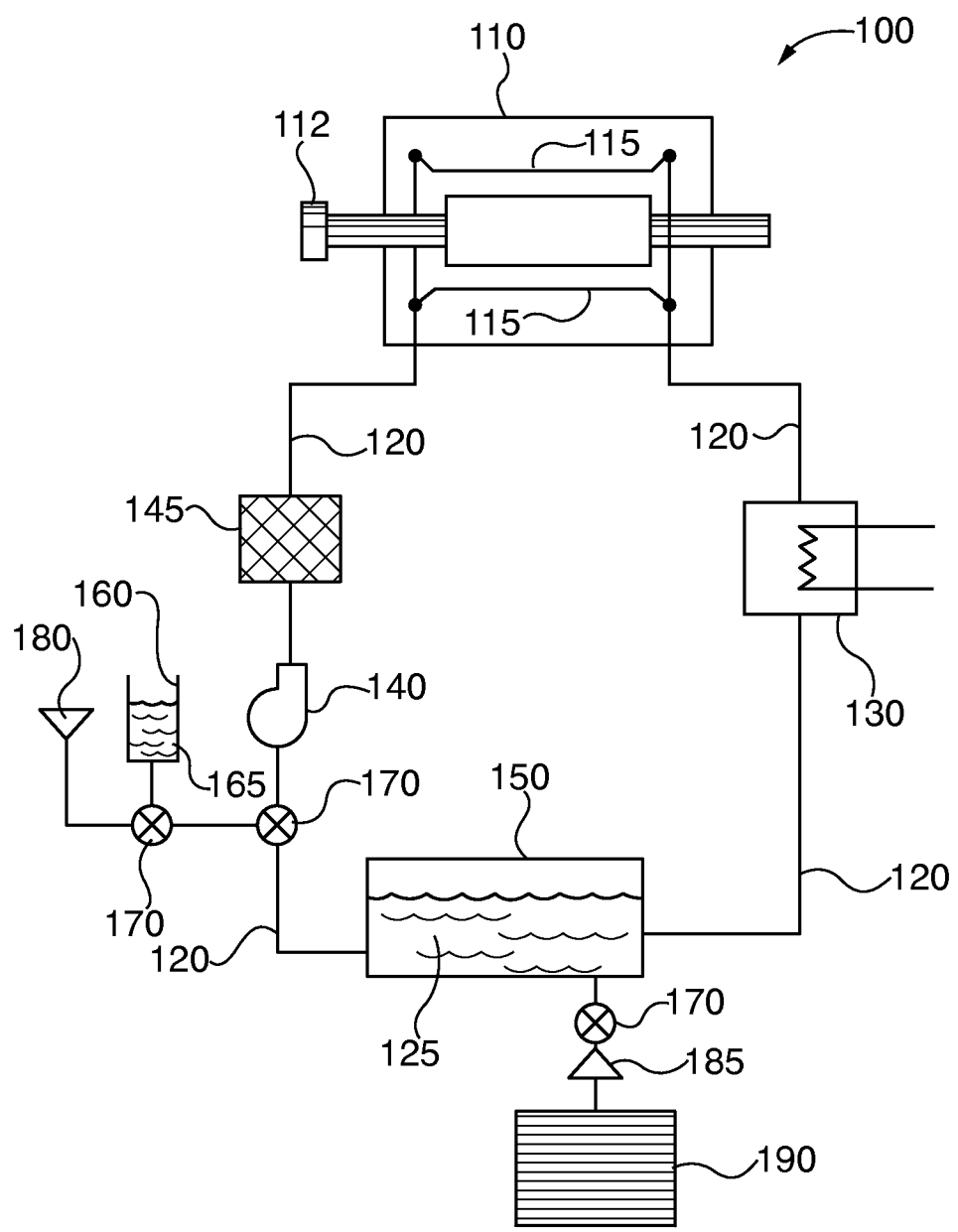
FIG. 1 is a schematic illustration of an exemplary stator cooling water (SCW) system for cooling the stator of an industrial electrical generator that includes components to facilitate removal of cuprous oxide deposits from the system, in accordance with exemplary embodiments of the present disclosure.

Throughout the drawings, the same reference numerals and characters, unless otherwise stated, are used to denote like features, elements, components, or portions of the illustrated embodiments. Similar features may thus be described by the same reference numerals, which indicate to the skilled reader that exchanges of features between different embodiments can be done unless otherwise explicitly stated. Moreover, while the present disclosure will now be described in detail with reference to the figures, it is done so in connection with the illustrative embodiments and is not limited by the particular embodiments illustrated in the figures. It is intended that changes and modifications can be made to the described embodiments without departing from the true scope and spirit of the present disclosure as defined by the appended claims.

DETAILED DESCRIPTION OF EXEMPLARY EMBODIMENTS

The present disclosure relates to methods and systems for removing cuprous oxide deposits from copper-containing conduits that may be present, e.g., in industrial electrical power generators that have liquid-cooled stators and in similar copper-containing cooling systems.

A schematic illustration of an exemplary stator cooling water (SCW) system 100 for a generator stator 110, which can facilitate cleaning or removal of cuprous oxide ($Cu_2O$) precipitates in accordance with exemplary embodiments of the present disclosure, is shown in FIG. 1. The SCW system 100 can include a stator 110 with copper-containing passages 115 that are connected via conduit 120 to a heat exchanger 130. A fluid pump 140 and a filter arrangement 145 can be provided in communication with the conduit 120 to form a closed-loop path that can circulate a coolant 125 therethrough. The coolant 125 is typically cooling water having a low conductivity (e.g., less than about 10 µS/cm), and in certain systems it can also have a low level of dissolved oxygen (e.g., less than about 50 µg/l (ppb)).

Optionally, a reservoir 150 can be provided in line with the conduit 120 to provide a storage volume for the coolant 125, facilitate addition and/or withdrawal of coolant 125 from the SCW system, etc. The filter arrangement 145 can include, e.g., a screen to filter out particulates from the circulating coolant 125 and/or any conventional filter media commonly used in SCW systems to reduce the level of impurities in the coolant 125. A rotor 112 of the generator is also shown in FIG. 1.

In typical operation, the coolant 125 is pumped through the conduit 120 and through the passages 115 of the stator 110, where it can remove heat that is produced in the stator 110 during operation of the generator. The heated coolant 125 then flows through conduit 120 to the heat exchanger 130, where the coolant 125 is cooled down and pumped through the reservoir 150 and filter arrangement 145, and back through the passages 115 by the pump 140 to remove further heat therefrom.

During operation of the generator, copper corrosion products may form in the cooling cycle. For example, in a low-oxygen systems (e.g., where the dissolved oxygen content is less than about 50 μg/l), precipitates of cuprous oxide ($Cu_2O$) may tend to form. These copper corrosion products deposits can accumulate in various portions of the SCW system, e.g., near the openings of the stator cooling passages 115, within the conduits 120, and in the filter arrangement 145, thereby reducing flow of coolant 125 therethrough and possibly leading to undesirable or dangerous overheating of the stator. The cooling efficiency may also decrease because of reduced heat transfer values through the copper corrosion products (e.g. the oxide precipitates).

The SCW system 100 can further include a cleaning solution source 160 that can be coupled to the reservoir 150 (if present) or directly to the conduit 120. The cleaning solution source 160 can be a vessel, container, or another enclosed or open volume configured to hold a volume of a liquid cleaning solution 165. A valve 170 can be provided to control a flow of the cleaning solution 165 from the cleaning solution source 160 into the reservoir 150 or conduit 120.

The cleaning solution 165 preferably includes a substance that is capable of forming a complex with cuprous ions, and thereby may dissolve cuprous oxide deposits that can form within an SCW system 100. For example, 1,10-phenanthroline has a structure as shown below:

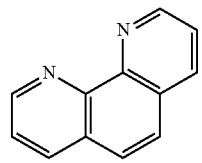 [SMILES: c1cnc2c(c1)ccc1cccnc12]

This compound has two nitrogen atoms positioned as shown by three aromatic rings. The location of these nitrogen atoms facilitates the formation of a 5-membered ring with a copper ion. For example, 2,9-dimethyl-1,10-phenanthroline, also known as neocuproine, is a substantially planar molecule that has the following structure:

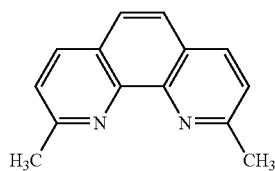 [SMILES: Cc1ccc2ccc3ccc(C)nc3c2n1]

Accordingly, two neocuproine molecules may form a complex with a cuprous ion ($Cu^+$). Cuprous ions have a tetrahedral coordination bond, such that when two neocuproine molecules form a complex with $Cu^+$, they tend to orient in approximately perpendicular planes.

There are other compounds that have similarly-situated nitrogen atoms and may also be effective in complexing cuprous ions such as, e.g., 2,2-bipyridine, which has the following structure:

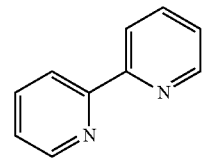 [SMILES: c1ccc(-c2ccccn2)nc1]

In one exemplary embodiment of the disclosure, the cleaning solution 165 can include a cuprous ion complexing agent such as, e.g., a 1,10-phenanthroline compound or a 2,2-bipyridine compound provided in solution. Such compounds can complex with cuprous ions, and thereby facilitate dissolution of cuprous oxides. In a further embodiment, the cleaning solution 165 can include 2,9-dimethyl-1,10-phenanthroline, also known as neocuproine. In addition to complexing cuprous ions and dissolving cuprous oxide well, neocuproine turns a bright orange color when complexed with cuprous ions. Thus, the degree of neocuproine-copper complexing in solution can be readily determined using optical or spectroscopic techniques.

The complexing agent (e.g., neocuproine or the like) can be dissolved in a short-chain alcohol, such as methanol or ethanol. In certain embodiments, ethanol may be preferable to ethanol due to its lower toxicity. Other solvents such as certain ketones may be used in the cleaning solution 165 to dissolve the cuprous ion complexing agent, although it may be preferable to use an alcohol, particularly if the SCW system contains gasket materials that are compatible with alcohols.

For example, in certain embodiments the cleaning solution 165 can be a solution of about 6% or slightly less of neocuproine in ethanol, e.g., about 5% neocuproine. Such concentration can dissolve the neocuproine sufficiently while still providing a relatively large concentration of neocuproine in the cleaning solution 165, and reduce a likelihood of precipitation of the neocuproine when the cleaning solution 165 is introduced into the coolant 125 as described below. In further embodiments, the cleaning solution 165 can include similar concentrations of a complexing agent (e.g., a 1,10-phenanthroline compound or a 2,2-bipyridine compound) in ethanol, methanol, or another short-chain alcohol. In still further embodiments, the cleaning solution 165 can be a solution of about 4 or 4.5% of a 1,10-phenanthroline compound (e.g. neocuproine) or a 2,2-bipyridine compound in alcohol. Such slightly lower concentrations can provide a sufficient amount of the cuprous ion complexing agent while reducing a likelihood of precipitation of the complexing agent when it is introduced into the coolant 125 as described below.

The cleaning solution 165 can be introduced from the cleaning solution source 160 into the coolant 125 through the conduit 120, as shown in FIG. 1, or alternatively it can be introduced directly into the reservoir 150. A valve 170 can be used to control the amount of cleaning solution 165 that is mixed into the coolant 125. In certain embodiments of the disclosure, a flow meter or similar flow measurement and/or control arrangement (not shown) can be used to facilitate introduction of a particular or predetermined amount of the cleaning solution 165 into the coolant 125.

The cleaning solution 165 can be introduced into the coolant 125 until the concentration of the cuprous ion complexing agent within the coolant 125 reaches a molarity of about 6e-3 M. The alcohol or ketone solvent in the cleaning solution 165 can help prevent precipitation of the cuprous ion complexing agent in the coolant 125. If the cuprous ion complexing agent is present in the cleaning solution 165 at a higher concentration (e.g., greater than about 5%), then it may be preferable to introduce the cleaning solution 165 initially at a lower concentration (e.g., about 4e-3 M of the cuprous ion complexing agent) and allow some of the cuprous ion complexing agent to form complexes with cuprous ions before introducing additional cleaning solution 165 into the coolant 125. The molarity of the complexing agent in the coolant 125 can be readily determined using standard calculations based on the total volume of coolant 125 in the system, the initial concentration of the cuprous ion complexing agent in the cleaning solution 165, and the volume of the cleaning solution 165 introduced into the coolant 125.

When introduced into the coolant 125 as described herein, the complexing agent in the cleaning solution 165 can form a complex with cuprous ions from the cuprous oxide deposits that may be present within the SCW system 100. Such complexing can effectively dissolve or remove some or all of the undesirable cuprous oxide, and can improve flow through the conduits 120, cooling passages 115, and/or the filter arrangement 145, where such deposits may accumulate and obstruct flow passages during operation of the generator. Further, the complexing agents described herein will tend to react primarily with the cuprous ions in the cuprous oxide deposits, leaving metallic copper that may be present within the SCW system 100 relatively untouched and intact. This selectivity for the cuprous oxide deposits is beneficial for removing such deposits without harming other components of the SCW system 100.

In further embodiments, a small amount of a weak acid, such as acetic acid or the like, can be added to the cleaning solution 165 to improve the dissolution rate of the cuprous oxide deposits. For example, the acid can help maintain a substantially neutral pH in the coolant 125 by neutralizing hydroxide that can be formed during complexing of the cuprous ions from $Cu_2O$. The molar concentration of the acid in the cleaning solution 165, if present, can be of the same order as the molar concentration of neocuproine therein, or slightly less (e.g. about 25-50% of the neocuproine concentration).

After the complexing agent (e.g. neocuproine or the like) is added to the coolant 125 via the cleaning solution 165, the complexing agent can become substantially saturated as it forms a complex with the cuprous ions that may be present as cuprous oxide. For example, two molecules of neocuproine (or another 1,10-phenanthroline compound or a 2,2-bipyridine compound) will form a complex with a single Cu' ion, as described above. Once the complexing agent has combined with a copper ion, it cannot dissolve any further cuprous oxide deposits.

When using neocuproine as the complexing agent, an optical window or sampling port (not shown) can be provided in a section of the conduit 120 and/or in the reservoir 150. The neocuproine-copper complex has a relatively strong absorption peak at about 455 nm. Accordingly, in-situ visual observation (e.g. transmissivity measurements) can be used to determine the extent of neocuproine complexing using conventional optical techniques. Alternatively, a sample of the coolant 125 containing the reacted neocuproine-copper complex can be withdrawn at one or more times and diluted (e.g. by a ratio of about 15:1-25:1) to obtain a more accurate determination of the extent of complexing (and associated dissolution of cuprous oxide) using, e.g., conventional spectrophotometric analysis or the like. Other complexing agents may also exhibit certain optical properties when forming a complex with the cuprous ions, and such properties may also be used in a similar manner to assess the presence and/or extent of cuprous oxide removal in the SCW system 100 during the cleaning procedure.

Once a sufficient amount of the complexing agent has been used up in the coolant 125, such that there is relatively little unreacted complexing agent remaining in the coolant 125 to dissolve further cuprous oxide, some of the coolant 125 can be withdrawn from the SCW system 100, e.g., via a drain 185. Fresh coolant 125 can simultaneously or subsequently be introduced into the SCW system 100, e.g., via a source 180, together with an appropriate amount of additional cleaning solution 165 from the cleaning solution source 160 as described herein. Such removal and replenishment of the cleaning solution 165 (together with some coolant 125) can be continued until the flow and/or cooling behavior of the SCW system 100 has improved sufficiently, and/or until there is a detectable decline in the amount of complexed cuprous ions in the coolant 125 when further complexing agent is added.

Various configurations of the source 180 and drain 185 can be used in accordance with embodiments of the present disclosure. The exemplary configuration shown in FIG. 1 includes the drain 185 configured to remove coolant 125 from the reservoir 150, and the source 180 configured to introduce coolant 125 directly into the conduit 120 at a location between the reservoir 150 and the cooling passages 115. In further embodiments, the source 180 may be configured to introduce coolant 120 directly into the reservoir 150, and/or the drain 185 may be configured to remove coolant 125 directly from a portion of the conduit 120. The particular locations of the source 180 and drain 185 may be selected based on the geometry of a particular SCW system 100. Such locations can be selected, e.g., to facilitate removal of primarily 'depleted' coolant 125 (e.g., coolant 125 containing complexing agent that has combined with cuprous ions) and simultaneous or subsequent introduction of further coolant 125 with 'fresh' (e.g. unreacted) cleaning solution 165. Valve arrangements 170 can be used, together with optional flow detectors/controllers and an optional control system (also not shown) to facilitate replacement of depleted coolant 125 with fresh coolant 125 together with an appropriate concentration or amount of unreacted complexing agent in the cleaning solution 165. Variations in the exemplary configuration of valves 170 in the SCW system 100 shown in FIG. 1 can also be used. For example, a valve 170 can be provided on a portion of the conduit 120 between the inlet 180 and drain 185, e.g., so that most or all of the coolant mixture in the SCW system (e.g., fluid located in the conduits 120 and cooling passages 115) can exit the drain 185 instead of recirculating, while fresh coolant 125 (optionally containing uncomplexed complexing agent) can enter the SCW system 100 from the inlet 180 and/or cleaning source 165.

Additionally, certain system parameters such as flow rate or coolant temperature (measured at one or more points in the SCW system 100) can be used to indicate a dissolution of cuprous oxide deposits during the cleaning procedures described herein. An increase in coolant flow rate at constant pump setting, or a change in observed coolant temperature in the system, can indicate removal of oxide deposits within the system and improved efficiency of heat extraction from the stator 110.

Accordingly, improvement in cooling performance of the SCW system 100 and removal of cuprous oxide deposits during or after a cleaning procedure may be determined, e.g., based on flow rates and/or temperature of coolant 125 in the conduits 120 (which can indicate the presence or lack of oxide deposits that can impede flow), by chemical, and/or spectrophotometric analysis of the coolant to indicate the presence and/or concentration of complexed cuprous ions in the coolant 125, by visual observation of the coolant (e.g., an orange color using neocuproine as a complexing agent can indicate the presence of neocuproine-copper complexes), etc.

After enough of the cuprous oxide deposits have been dissolved and/or removed from the SCW system 100 and/or the performance of the SCW system has improved sufficiently, the coolant 125 containing cleaning solution 165 (with complexed and/or unreacted complexing agent) can be removed from the system 100 (e.g., via drain 185), and regular coolant 125 can be used to re-fill the SCW system 100 (including reservoir 150, if present). The SCW system 100 can then continue to be operated normally until such time as the cooling effectiveness and/or flow rate have diminished, at which time another cleaning procedure may be performed as described herein.

The cleaning system and method described herein facilitate removal of cuprous oxide deposits or precipitates from the interior passages of the SCW system 100 while maintaining a flow of the coolant 125 through the system 100. Accordingly, the disclosed cleaning method and apparatus can improve performance of the SCW system 100 while avoiding unwanted shutdown of the power generator itself. Such an approach is highly preferable over other approaches that may involve shutdown, disassembly, and cleaning or replacement of components to remove oxide deposits from within the system 100.

It may be desirable to recover at least a portion of the complexing agent used in the cleaning methods and systems described herein. For example, neocuproine is fairly expensive, and may cost about $2000 per kilogram or more. Further, about 6 kg of neocuproine may be needed to dissolve and remove each kilogram of copper (from the cuprous oxide deposits) from the SCW system 100. Thus, a cleaning procedure in which the used neocuproine is discarded afterwards may not be economically desirable or feasible.

In further embodiments of the disclosure, the complexing agent that may be provided in the cleaning solution 165 and mixed with the coolant 125 during a cleaning procedure may be recovered. For example, coolant 125 that is removed from the SCW system 100 (e.g. through drain 185) can be directed into a recovery arrangement 190 to recover the complexing agent and remove copper from the complexes so the complexing agent can be recovered and optionally re-used.

Figure 2:
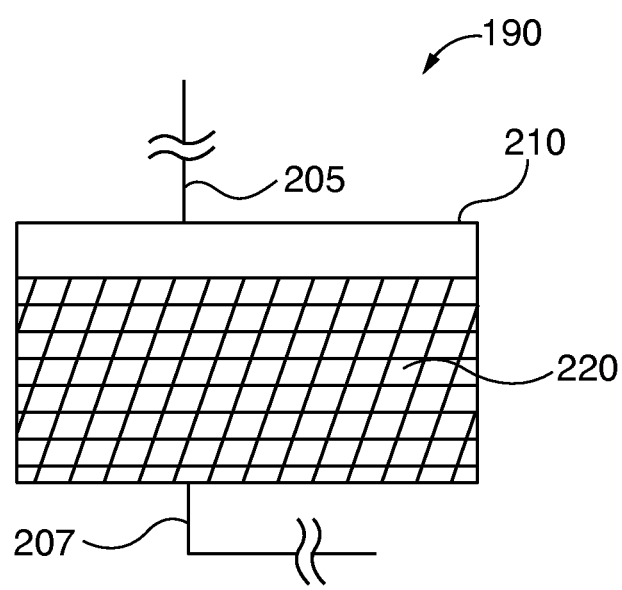
FIG. 2 is a schematic illustration of a recovery arrangement that can recover complexing agents used to remove such deposits, in accordance with further exemplary embodiments of the present disclosure.

Further details of an exemplary recovery arrangement 190 are shown in FIG. 2. The recovery arrangement 190 can include one or more vessels 210 containing a bed of adsorbent material 220. Coolant 125 containing complexed and/or uncomplexed complexing agent can be directed into the recovery arrangement 190 through inlet 205 (which may be coupled to the drain 185 shown in FIG. 1) and passed through the adsorbent material 220 to recover at least a portion of the complexing agent. At least a portion of the complexing agent can be retained in the adsorbent material 220, and the coolant mixture (containing, e.g., water and alcohol) may then exit the vessel 210 via outlet 207. In further embodiments, one or more holding tanks (not shown) can be provided between the drain 185 and the inlet 205 to provide more flexibility in controlling the timing and rate of recovery of the complexing agent from the coolant mixture.

In certain embodiments of the disclosure, the adsorbent material can be a conventional ion exchange resin, which may be selected to provide effective extraction of the particular complexing agent used. The vessel(s) 210 can be sized and/or configured to provide an appropriate flow rate of the coolant 125 through the adsorbent material 220 to facilitate efficient extraction of the complexing agent.

In further exemplary embodiments, the adsorbent material 220 can be activated carbon. Activated carbon is readily available and is typically less expensive than ion exchange resins. When using activated carbon, a depth of the bed can be at least about 50 cm, e.g., about 60 cm or more. The vessel(s) 210 can be sized and shaped to provide a linear flow rate of about 2 cm per minute or less. Such adsorbent bed parameters can provide effective extraction of the complexing agent from the mixture of coolant 125 (which may be primarily water), alcohol, and complexing agent that passes therethrough. A linear flow rate of about 1 cm per minute or less may provide a more efficient recovery of the complexing agent from the coolant mixture.

The number, sizes and shapes of the vessel(s) 210 can be selected to provide sufficiently low flow rates, long contact times, and amount of adsorbent material 220 for good recovery of the complexing agent. The number and sizes of the vessels 210 can also be selected based on the amount of coolant/alcohol/complexing agent mixture to be processed and total volumetric rate of processing. Such factors may also depend on the overall coolant capacity of the SCW system 100.

For example, a single large recovery vessel 210 may be preferable for smaller volumes and/or rates of processing, to reduce the number of components and simplify the physical arrangement. In further embodiments, a plurality of vessels 210 may be preferable, e.g., to improve material handling and further processing (e.g., by using smaller volumes of adsorbent material 220 in each vessel 210) or to provide more flexibility in extraction rates (e.g. by varying the number of vessels 210 in use at a particular time).

An adsorbent material 220 such as activated carbon can extract both uncomplexed and complexed complexing agent (e.g. neocuproine) from the coolant mixture. The complexing agent can then be recovered from the adsorbent material 220, and copper can be removed from the complexes that may be formed during the cleaning procedure. The resulting uncomplexed complexing agent can then be re-used in further cleaning procedures.

For example, after the coolant mixture has been passed through the adsorbent material 220, an extraction fluid (e.g., an alcohol such as denatured alcohol, or other solvent such as hexanol or the like) can be directed into the inlet 205 (using appropriate valves and piping arrangements, not shown) or via an additional inlet (not shown) and passed through the adsorbent material 220. The extraction fluid, which can remove adsorbed complexing agent from the adsorbent material 220, can be recovered from the outlet 207 for further processing. The extraction fluid can then be evaporated or otherwise reacted to concentrate the recovered complexing agent using standard chemical techniques.

A copper-specific ion exchange resin can be used to extract copper from the copper-neocuproine complex or other complexed complexing agent. However, such resins may tend to retain undesirable amounts of the complexing agent as well. For example, such ion exchange resin may retain one molecule of the complexing agent from the complex with each copper ion, and may further remove intact copper complexes once it has saturated.

In an exemplary embodiment of the disclosure, the extraction fluid containing some complexed copper can be reacted with sodium sulfide (Na$_2$S) to remove copper from the complexes. An excess of sodium sulfide can be used to improve the yield of copper removal. The complexing agent (e.g. neocuproine) can then be extracted with toluene and recovered by evaporating the toluene. In certain embodiments, an acid can be added to the mixture to improve the recovery yield of the complexing agent.

In further embodiments of the disclosure, certain portions of the cleaning and recovery procedures can be combined or integrated. For example, the mixture of coolant 125 and cleaning solution 165 entering the inlet 205 of the recovery arrangement 190 can include, e.g., water, alcohol, and both complexed and uncomplexed complexing agent. After adsorption of the complexing agent onto the adsorbent material 220, the fluid exiting the outlet 207 may contain primarily water and alcohol. This fluid can then be directed through additional complexing agent (e.g., complexing agent previously recovered as described herein, or a fresh supply of such complexing agent), which can be provided in n additional fluid bed (not shown). The alcohol present in the fluid may dissolve some of the complexing agent, and the dissolved complexing agent will not exceed its solubility limit. The resulting mixture of water/coolant, alcohol, and dissolved complexing agent can optionally be filtered to remove any undissolved particulates, and then be reintroduced into the SCW system 100 (e.g., through source 180) to provide further dissolution and removal of cuprous oxide deposits. Such mixture can be used instead of or in addition to adding more cleaning solution 165 and/or fresh coolant 125 into the system.

In still further embodiments of the disclosure, certain portions of the cleaning and recovery procedures described herein can be automated using conventional techniques. For example, temperature, flow and/or optical sensors can be provided in the SCW system 100 to detect changes in flow behavior, cooling rates, and/or composition of the coolant 125. Such detected properties can then be used to signal operators and/or control certain aspects of the cleaning procedure. For example, detecting a high percentage or concentration of complexed complexing agent in the coolant 125 can initiate a process to withdraw coolant from the system 100 as described herein and replace it with fresh coolant containing uncomplexed complexing agent. Control of such flows can be done manually or using conventional controllable valve arrangements.

Accordingly, certain exemplary embodiments of the present disclosure can provide a method and system for removing cuprous oxide deposits from an SCW system 100 or other copper-containing water-based cooling system. The disclosed methods and systems can provide such cleaning or deposit removal while maintaining the cooling performance of the SCW system 100, so that shutdown and/or disassembly of the generator can be avoided. Although particular embodiments of the present disclosure are illustrated in FIGS. 1 and 2, other exemplary configurations that embody the exemplary principles and functions herein can be used in further embodiments and are within the scope of the present disclosure.

The foregoing merely illustrates the principles of the present disclosure. Various modifications and alterations to the described embodiments will be apparent to those skilled in the art in view of the teachings herein. It will thus be appreciated that those skilled in the art will be able to devise numerous techniques which, although not explicitly described herein, embody the principles of the present disclosure and are thus within the spirit and scope of the present disclosure. All patents and publications cited herein are incorporated herein by reference in their entireties.

What is claimed is:

1. A method for removing cuprous oxide deposits from a copper-containing cooling system, comprising:
   introducing a complexing agent into a fluid coolant that flows through the cooling system and a generator stator cooled by the cooling system, wherein the complexing agent is selected to form a complex with cuprous ions and wherein the flow of fluid coolant through the cooling system and generator stator is maintained when the complexing agent is introduced into the fluid coolant; and
   removing a mixture of the complexing agent and the fluid coolant from the cooling system after at least a portion of the complexing agent has formed a complex with at least a portion of the copper contained in the cuprous oxide deposits wherein the flow of fluid coolant through the cooling system and generator stator is maintained when the mixture of the complexing agent and the fluid coolant is removed from the cooling system and wherein the introduction of the complexing agent and removal of complexing agent and fluid coolant are performed simultaneously.

2. The method of claim 1, wherein the complexing agent comprises a 2,2-bipyridine compound.

3. The method of claim 1, wherein the complexing agent comprises a 1,10-phenanthroline compound.

4. The method of claim 3, wherein the complexing agent comprises neocuproine.

5. The method of claim 1, wherein the complexing agent is dissolved in a solvent prior to introducing it into the fluid coolant.

6. The method of claim 1, further comprising:
   recovering at least a portion of the complexing agent from the removed mixture.

7. The method of claim 6, further comprising:
   removing copper from at least a portion of the recovered complexing agent.

8. A system for removing cuprous oxide deposits from a copper-containing cooling system, comprising:
   a cleaning solution source configured to introduce a complexing agent into a fluid coolant that flows through the cooling system and a generator stator cooled by the cooling system, wherein the complexing agent is selected to form a complex with cuprous ions and wherein the flow of fluid coolant through the cooling system and generator stator is maintained when the complexing agent is introduced into the fluid coolant; and
   a drain arrangement configured to remove a mixture of the complexing agent and the fluid coolant from the cooling system after at least a portion of the complexing agent has formed a complex with at least a portion of the copper contained in the cuprous oxide deposits wherein the flow of fluid coolant through the cooling system and generator stator is maintained when the mixture of the complexing agent and the fluid coolant is removed from the cooling system and wherein the introduction of the complexing agent and removal of the complexing agent and fluid coolant are performed simultaneously.

9. The system of claim 8, wherein the complexing agent comprises at least one of a 2,2-bipyridine compound or a 1,10-phenanthroline compound.

10. The system of claim 8, wherein the complexing agent comprises neocuproine.

11. The system of claim 8, wherein the cleaning solution further comprises a weak acid.

12. The system of claim 11, wherein a molar concentration of the weak acid in the cleaning solution is less than a molar concentration of the complexing agent in the cleaning solution.

13. The system of claim 8, further comprising a recovery arrangement configured to recover at least a portion of the complexing agent from the removed mixture.

14. The system of claim 13, wherein the recovery arrangement comprises an adsorbent material.

15. The system of claim 13, wherein the adsorbent material comprises activated carbon.

16. The system of claim 13, wherein the adsorbent material comprises a copper-specific ion-exchange resin.

* * * * *